(12) United States Patent
McGeachy (10) Patent No.: US 6,257,277 B1
(45) Date of Patent: Jul. 10, 2001

(54) MODULAR MULTIPLE OUTPUT PNEUMATIC PRESSURE VALVE

(75) Inventor: Donald E. McGeachy, Commerce Township, MI (US)

(73) Assignee: Numatics, Incorporated, Highland, MI (US)

(*) Notice: Subject to any disclaimer, the term of this patent is extended or adjusted under 35 U.S.C. 154(b) by 0 days.

(21) Appl. No.: 09/583,470

(22) Filed: May 31, 2000

(51) Int. Cl.[7] ....................................... F16K 11/10
(52) U.S. Cl. ................... 137/599.08; 137/599.09
(58) Field of Search ..................... 137/599.08, 599.09

(56) References Cited

U.S. PATENT DOCUMENTS

| | | | |
|---|---|---|---|
| 3,661,168 | 5/1972 | McGeachy | 137/270 |
| 3,680,577 | 8/1972 | McGeachy | 137/625.6 |
| 5,522,431 | 6/1996 | Bonacorsi | 137/884 |
| 6,053,198 | 4/2000 | Atkin et al. | 137/315 |

OTHER PUBLICATIONS

Catalog "Mark 3 Series", 1999, of Numatics, Incorporated, Highland, Michigan.

*Primary Examiner*—John Fox
(74) *Attorney, Agent, or Firm*—Reising, Ethington, Barnes, Kisselle, Learman & McCulloch, P.C.

(57) ABSTRACT

A multiple output modular pneumatic pressure valve has a plurality of modules connected together. Each module has a regulator, shuttle valve and four way solenoid actuated spool valve for provides a plurality of pneumatic pressures to a single outlet which may be quickly selected via the actuation and deactuation of the proper valves. Adjustment of the pneumatic pressures can be easily performed by rotation of a knob of the pressure regulator.

5 Claims, 5 Drawing Sheets

MODULAR MULTIPLE OUTPUT PNEUMATIC PRESSURE VALVE

FIELD OF THE INVENTION

The field of this invention relates to solenoid actuated fluid control valves and more particularly to a pneumatic valve that can supply various preselected pneumatic pressures.

BACKGROUND OF THE INVENTION

Solenoid actuated valves for controlling the flow of pneumatic fluid have long been used to supply a preselected pneumatic pressure for various tools. Furthermore, various tools such as welding tips have been connected to a plurality of valves with each valve controlling a different pneumatic pressure such that the tool can be more adaptable and used for a range of purposes.

In the past, each pressure valve assembly was custom built with a customized manifold and circuit board for controlling the various solenoid valves. If a different pressure level is later to be added, the entire manifold and circuit board needed to be replaced to accommodate the additional pressure level.

These valves often include a relieving regulator to control the pressure level. When the pressure is lowered, the pneumatic pressure is relieved through bleeding of the relieving regulator. The bleeding through the relieving regulator is a relatively slow way to relieve pressure down to lower pressure levels. The slow bleeding process prevents rapid changes of pressure levels and limits the use of these valves to environments where rapid pressure changes are not necessary.

What is needed is a pressure selector valve assembly that is modular in construction for allowing an adjustment in the number of selected pneumatic pressure levels for the gas supply and also provides for a rapid change in the selected pressure.

SUMMARY OF THE INVENTION

In accordance with one aspect of the invention, a control valve assembly for supplying a choice of preselected pressure levels from a pneumatic supply includes a manifold connectable to a common primary pneumatic pressure. First and second regulators are mounted onto the manifold. Each regulator has an inlet for receiving pneumatic pressure from the common primary pneumatic pressure. Preferably, first and second regulator supply passages extend from the primary supply to each regulator. The first and second regulators have an outlet for providing respective different first and second lower secondary pressures to an electrically actuated selector valve that is mounted onto the manifold.

It is desirable that the manifold has respective intermediate passageways for receiving the outlet pressure from said respective regulators and passing the pneumatic pressure onto the inlets of the selector valve. Preferably, the manifold has two opposite sides with an outlet side having a supply passage port, an exhaust passage and a discharge passage therethrough. The manifold inlet side has a supply passage port and inlet port for receiving pneumatic pressure. It is desirable that the primary supply passage and the exhaust passage are in the form of galleries that pass directly through each manifold.

The selector valve includes a housing with two inlet ports, two outlet ports and an exhaust port connected to a valve chamber and at least one valve element operably mounted in the chamber. The selector valve is movable to a selected one of two positions based on the electrical actuation or de-actuation of the selector valve such that a respective inlet port is connected to its respective outlet port and the other inlet port is closed from its respective outlet port which in turn is in communication with the exhaust port.

It is desirable that the selector valve is a solenoid actuated spool valve. The inlet ports of the selector valve are in fluid connection with the respective outlet ports of the regulators for supplying the respective pneumatic pressures to the selector valve. The respective outlets of the selector valve are connected to respective inlets of a shuttle valve. The shuttle valve has a single outlet selectively in communication with one of its respective inlets that contains a higher pneumatic pressure therein. The exhaust port of the solenoid actuated selector valve is in communication with the exhaust passage in the manifold. The outlet port of the shuttle valve is in communication with a discharge passage in the manifold for receiving a selected one of the secondary pressures from the respective regulators via the selector valve.

Preferably, the shuttle valve has a housing mounted in an interposed position between a respective selector valve and the respective manifold. The shuttle valve housing has an exhaust passage that connects the exhaust port of the selector valve to the exhaust passage in the manifold.

In accordance with another embodiment of the invention, a modular pneumatic pressure control valve assembly for supplying a choice of pre-selected pressure levels from a pneumatic supply includes an actuatable selector valve mounted onto the manifold. The selector valve includes a housing with two inlet ports and two outlet ports connected to a valve chamber and at least one valve element operably mounted in the valve chamber. The valve element is moveable to a selected one of two positions based on the electrical actuation or de-actuation of the valve such that a respective inlet port is connected to its respective outlet port and the other inlet port is closed from its respective outlet port. The first manifold is connectable to a second manifold. The second manifold has an auxiliary regulator mounted thereon for regulating pneumatic pressure from the primary supply passage. The second manifold also has a secondary inlet port in communication with the discharge passage of the first manifold for receiving a secondary pressure from one of the regulators on the first manifold. The auxiliary regulator has an outlet for providing an auxiliary secondary pressure different from said first and second lower secondary pressures.

An auxiliary electrically actuated selector valve is mounted onto the second manifold. The auxiliary selector valve is substantially the same as the selector valve on the first manifold and receives pneumatic pressure from the respective inlets.

The respective outlets of the auxiliary selector valve are connected to respective inlets of an auxiliary shuttle valve which has a single outlet selectively in communication with the inlet of the auxiliary shuttle valve that has a higher pneumatic pressure therein. The outlet port of the shuttle valve is in communication with an outlet passage in the auxiliary manifold for receiving a selected one of the secondary pressures from the respective first, second, or auxiliary regulators via the selector valves.

Preferably, the first and second manifolds are identically constructed with the same passages therethrough. The manifolds have respective first and second intermediate passageways for receiving the outlet pressure from the respective regulators and passing the pneumatic pressure onto the inlets of said selector valve.

The first manifold has its secondary inlet port being sealed by an end plate mounted thereon. The second manifold has its second regulator supply passage and second intermediate passage closed by a mounted sealing plate.

In accordance with another embodiment of the invention, a multiple pneumatic pressure output valve includes a plurality of manifolds each having at least two intake ports connectable to a supply of pneumatic pressure and two discharge ports. The manifolds are mounted adjacent each other with an outlet of one manifold in communication with a discharge port of a previous manifold. At least one regulator is mounted on each manifold for receiving pneumatic pressure from a respective one of the intake ports and providing respective different lower pneumatic secondary pressures to an appropriate selector valve mounted onto each manifold. The selector valve includes a housing with two inlet ports for receiving the pneumatic pressure from the respective regulators and at least one outlet port connected to one of the discharge ports. A valve element is moveable to a selected one of two positions based on the electric actuation or de-actuation of the valve such that a respective inlet port is connected to an outlet port and the other inlet port is closed.

BRIEF DESCRIPTION OF THE DRAWINGS

These and other objects, features and advantages of this invention will be apparent from the following detailed description of the preferred embodiments and best mode, appended claims, and accompanying drawings in which:

DETAILED DESCRIPTION OF THE PREFERRED EMBODIMENT

Figure 1:
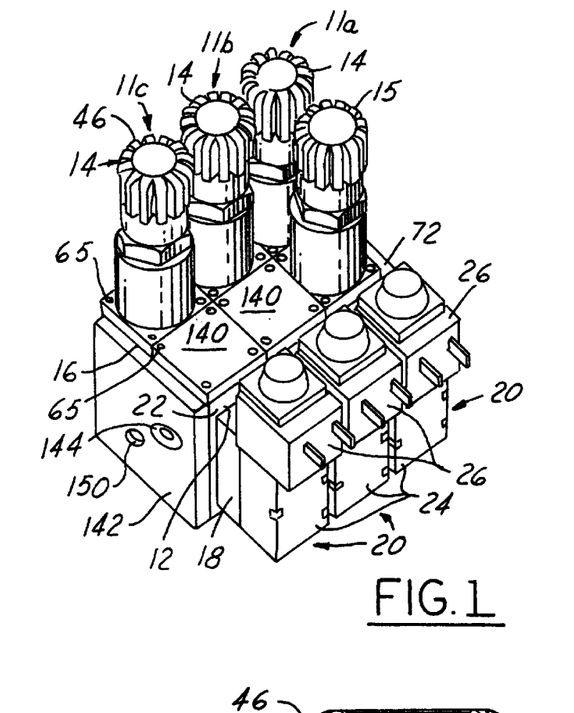
FIG. 1 is a perspective view of one-embodiment of a modular multiple output pressure valve assembly showing three modules assembled together according to the invention.
Figure 2:
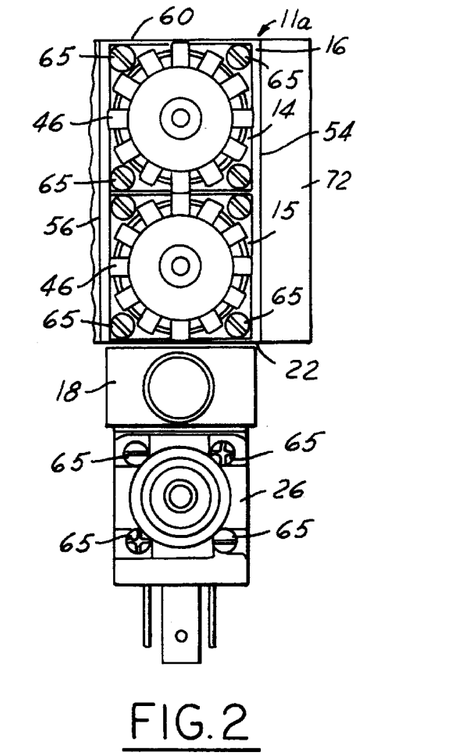
FIG. 2 is a top plan view of the first module shown in FIG. 1.
Figure 3:
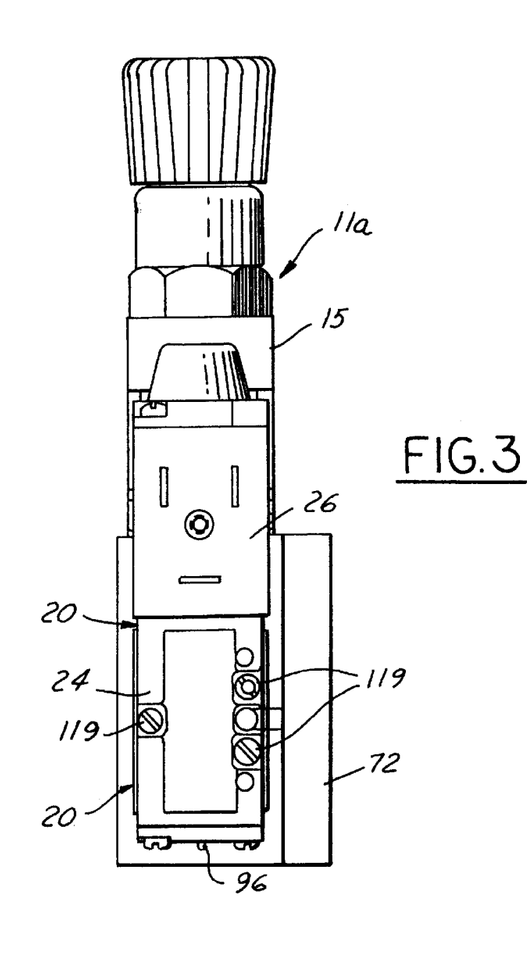
FIG. 3 is a front elevational view of the first module.

Referring now to FIGS. 1–3, a modular multiple output pressure valve 10 includes a plurality of modules 11a, 11b, and 11c assembled in sequence. Each module 11 has a manifold 12 with at least one pressure regulator 14, 15 mounted at the top side 16. Each manifold 12 also has a shuttle valve 18 and solenoid actuated valve 20 mounted on the front side 22. Each solenoid actuated valve 20 has a valve body 24 and a solenoid housing 26 attached thereto.

Figure 4:
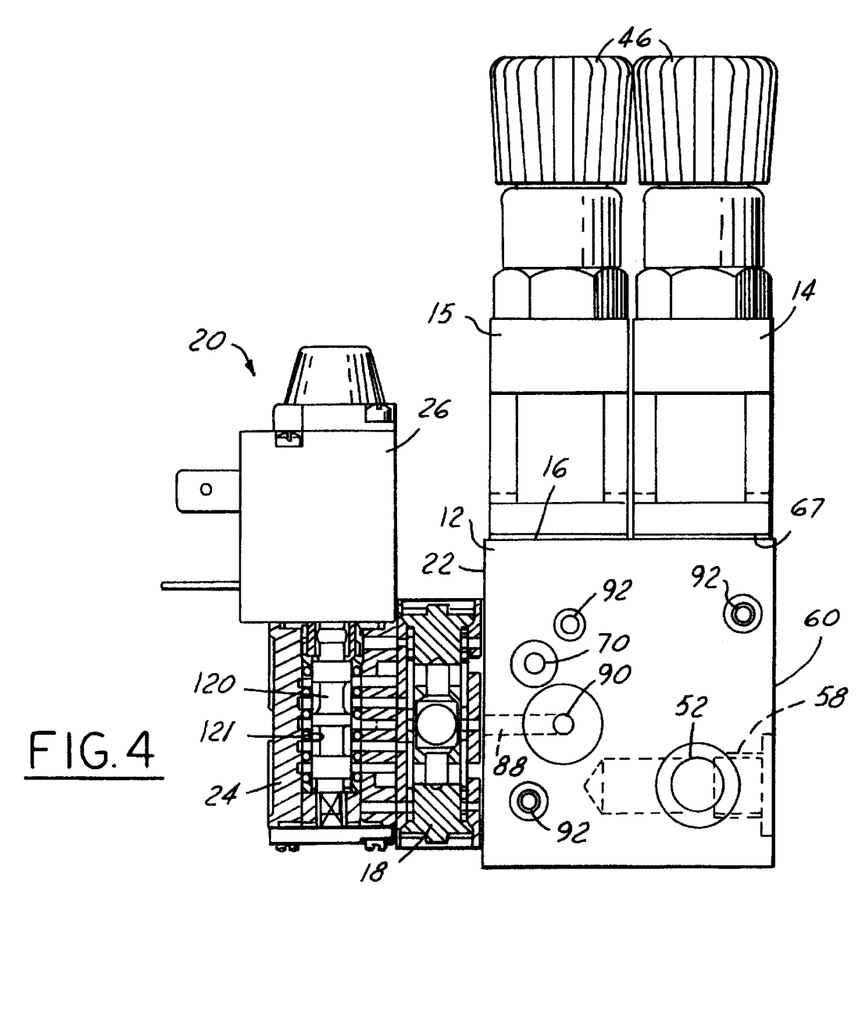
FIG. 4 is a side elevational and partially segmented view of the first module shown in FIG. 1 with the end plate removed.
Figure 5:
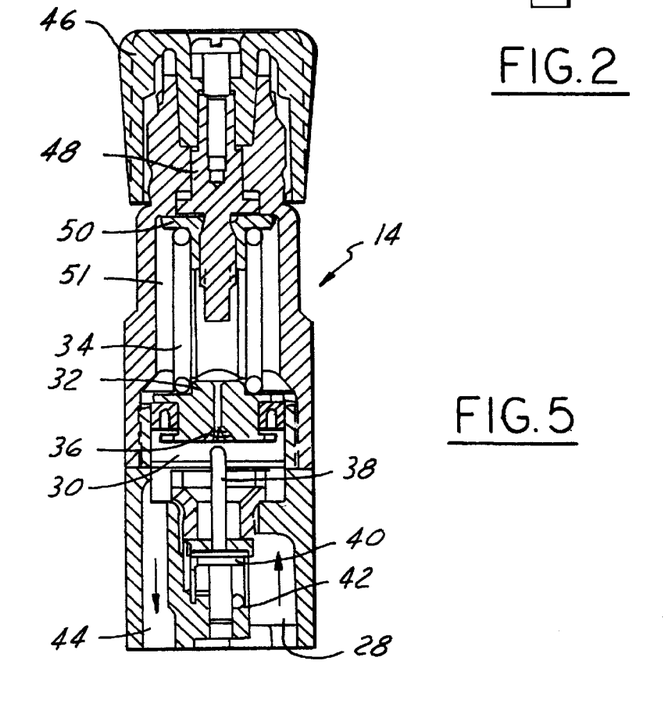
FIG. 5 is a segmented view of one of the regulators.

As shown in FIGS. 2 and 4, the first module 11a has two regulators 14 and 15 mounted on the top side 16. Regulator 15 and regulator 14 have identical construction and are commercially available. However, reference now is made to regulator 14 as shown in FIG. 5 to generally describe the interior. Regulator 14 has an inlet port 28 20 which leads to poppet valve 40. A chamber 30 lies above poppet valve 40 and houses a movable bleed port piston 32 that is biased on its backside by spring 34. When the pressure in chamber 30 is sufficiently great, the pressure lifts the piston 32 to close the poppet valve 40. The regulator valve also allows air to bleed from the chamber 30 and out through opening 36 in the piston 30. When the pressure in chamber 30 is less than the spring biasing force, the piston is lowered by the spring bias force and bleed opening 36 is closed by a pin stem 38. In addition, pin stem 38 is attached to a seated poppet valve 40 that is then forced open against bias exerted by second spring 42. The valve 40 opens inlet port 28 to outlet port 44. The bias of spring 34 may be adjusted by turning knob 46 which turns a threaded rod 48. A nut 50 threadably engages to the rod and is non-rotatably but slidably mounted in spring chamber 51. As knob 46 and threaded rod 48 rotate, the nut 50 rides along rod 48 and compresses or relaxes spring 34 to vary the bias exerted on piston 32. Thus, the outlet port 44 has an adjustably regulated pneumatic pressure therein.

Figure 6:
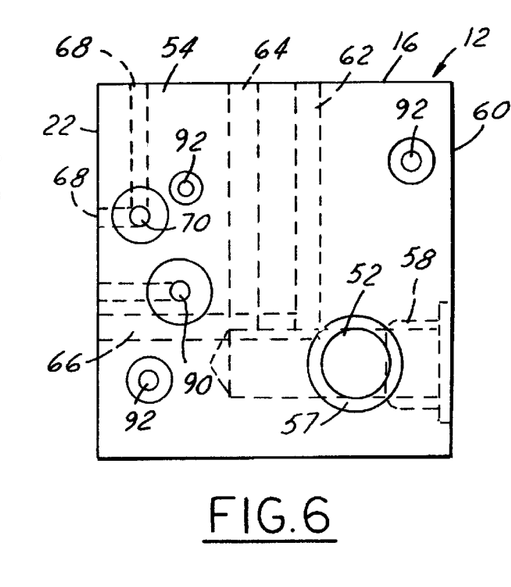
FIG. 6 is a side elevational view of the inlet side of a manifold.
Figure 7:
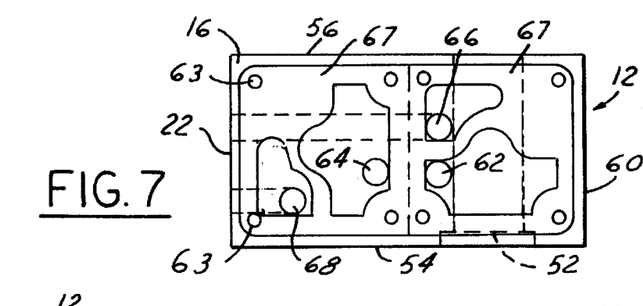
FIG. 7 is a top plan view of the manifold with the seal that seats the regulators overlaid thereon.

The manifold 12 and its passages will now be described with reference to FIGS. 6–9. As shown in FIGS. 6 and 7, a primary supply port 52 extends from the inlet side 54 to the discharge side 56. A shoulder 57 for seating a sealing O-ring (not shown) surrounds the port 52 on the inlet side 54. A threaded drill passage 58 is drilled from the back side 60 and intersects the primary supply port 52. Regulator supply passages 62 and 64 are in communication with passage 58 and port 52. The regulator passages 62 and 64 extend to the top side 16 where they supply respective regulators 14 and 15 respectively.

Sealing gaskets 67 are shown overlaid on the top side 16 such that when the regulators are mounted via fasteners 65 onto the top side 16, the gasket appropriately seals each passage 62, 64, 66 and 68 from each other. Gaskets 67 and top side have aligned apertures 63 which threadably engage the fasteners 65.

After the primary pressure supply is regulated by the respective regulators 14, 15, the secondary pressures from the regulators 14, 15 then re-enter the manifold through respective intermediate passage 66 and 68. Intermediate passage 68 intersects an intake port 70 on the inlet side of manifold 12.

Figure 8:
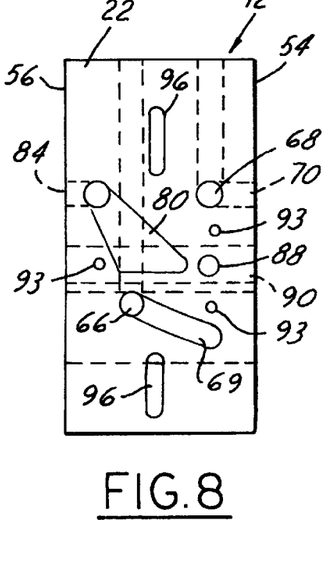
FIG. 8 is a front elevational view of the manifold that leads to the shuttle valve and solenoid actuated valve.
Figure 9:
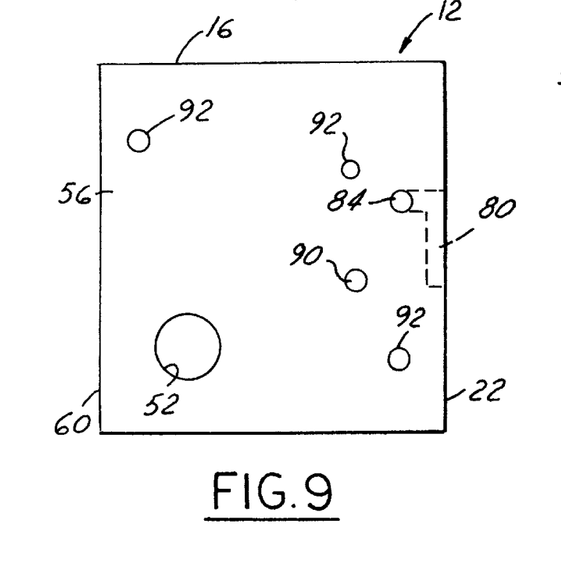
FIG. 9 is a side elevational view of the discharge side of the manifold.

As shown in FIGS. 2 and 3, the intake port 70 is closed by an end plate 72 for the first module 11a Thus the two different intermediate passages 66 and 68 can be supplied with two different secondary pressures as adjusted by the regulators 14 and 15. As shown in FIG. 8, the intermediate passages 66 and 68 have their downstream ends extend to the front side 22 of manifold.

Figure 15:
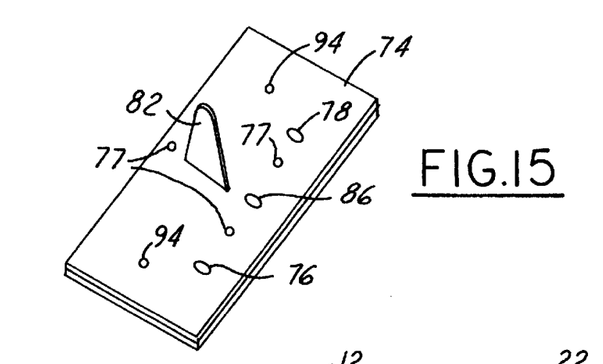
FIG. 15 is a perspective view of the sealing gasket member that is interposed between the manifold and shuttle member.

A sealing gasket 74 as shown in FIG. 15 is mounted on the front side 22 with appropriate apertures 76 and 78 in fluid communication with intermediate passages 66 and 68. The intermediate passage 66 has a grooved debossment 69 to assure alignment with the sealing gasket aperture 76 FIG. 8. The sealing gasket 74 may have a center layer of aluminum surrounded by layers of elastomeric material to provide durability. It also has mounting apertures 77 therethrough.

After pneumatic pressure is switched by the shuttle valve 18 and spool valve 20, pneumatic pressure is then returned through the gasket 74 and a generally triangular aperture 82 through to an aligned complementary shaped discharge exit passage 80 in the front end 22 as shown in FIG. 8. The discharge exit passage 80 is in communication with a discharge port 84 in the discharge side 56 of the manifold. The gasket 74 also has an exhaust aperture 86 aligned with an exhaust port 88 which is in fluid communication with an exhaust conduit 90 traversing from the intake side 54 to discharge side 56. Bleed apertures 94 pass through gasket 74 and communicates with bleed slots 96 on front side 22. Threaded mounting holes 93 extend through front side 22. Other mounting apertures 92 pass through the manifold from the intake side 54 to the discharge side 56.

Figure 11:
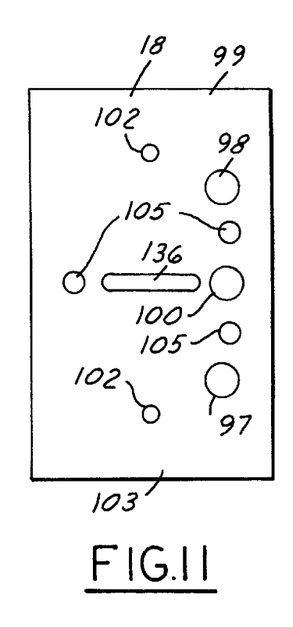
FIG. 11 is an elevational view of the side of the shuttle valve that faces the manifold.
Figure 12:
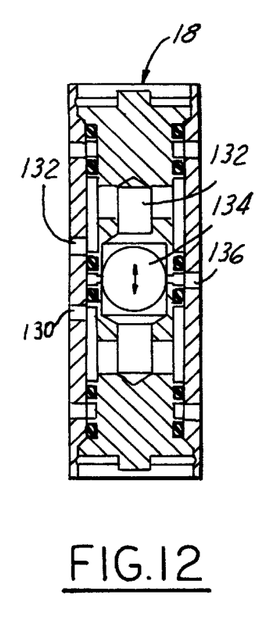
FIG. 12 is a segmented view of the shuttle valve.
Figure 14:
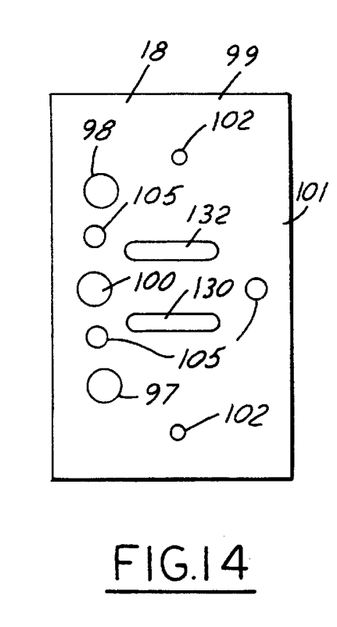
FIG. 14 is an elevational view of the side of the shuttle valve that faces the solenoid actuated valve.

The shuttle valve 18 and solenoid actuated valve 20 control which intermediate passage 66 or 68 is in communication with discharge exit 80 and discharge port 84. The shuttle valve 18 as shown in FIGS. 11, 12 and 14 has an outer housing 99 pass through intake apertures 97 and 98 that extend from side 101 that faces the solenoid actuated valve to the side 103 that faces the front side 22 of manifold 12. The apertures 97 and 98 are aligned with respective apertures 76 and 78 in gasket and intermediate passages 66 and 68 in manifold. Exhaust port 100 is similarly aligned with aperture 86 and passageway 88 in the gasket 86 and manifold 12 respectively. Bleed ports 102 also extend through the shuttle valve from the side 101 to side 103 and are aligned with bleed ports 94 in the gasket 74. Mounting holes 105 also extend through the shuttle valve housing.

Figures 10, 13:
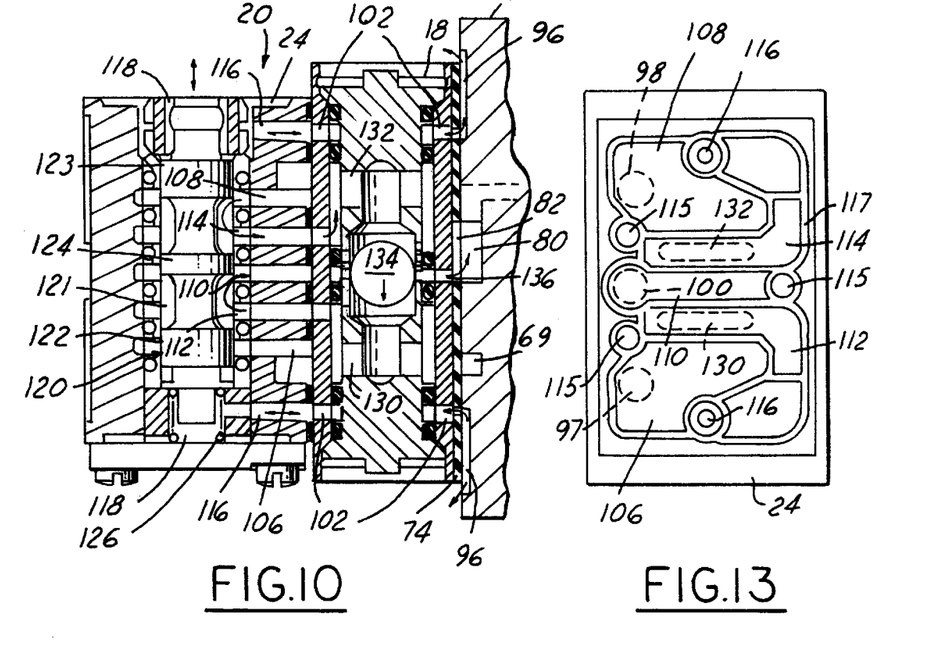
FIG. 10 is a fragmentary and segmented view illustrating the gas flow through the shuttle and solenoid actuated valves.
FIG. 13 is an elevational view of the solenoid actuated valve housing ports that face the shuttle valve with the shuttle valve ports overlaid in phantom.

As shown in FIG. 13, the apertures 97 and 98 are in communication with inlet ports 106 and 108 respectively in the valve body 24 of the solenoid actuated valve 20. Exhaust aperture 100 is similarly aligned with exhaust port 110 of the valve body 24. The valve body 24 also has first and second outlets 112 and 114. Bleed ports 116 are in communication with respective end chambers 118 in the spool valve 20. An appropriately shaped sealing gasket 117 is seated on the valve body 24 to seal off each port from one another when the valve body is connected to the shuttle valve. Mounting holes 115 also extend through the valve body 24 to be aligned with holes 105 in the shuttle and apertures 77 in the gasket 74 for receiving a threaded fastener 119 which threadably engages threaded holes 93 in the front side 22 of the manifold 12.

The spool valve 20 is a commercially available two position valve and has a spool and sleeve valve 120 operably mounted in a bore 121. The piston valve 12 has a first landing 122 that controls communication between inlet 106 and outlet 112, a second landing 123 that controls communication between inlet 108 and outlet 114, and a middle landing that controls communication between exhaust port 110 and either outlet 112 and 114. The landings 122, 123, and 124 are spaced such that the spool valve 20 functions as a conventional four way valve by selecting either inlet 106 to be open to outlet 112 or alternatively inlet 108 to be open to outlet 114. Correspondingly, exhaust port 100 is open to either outlet 114 or 112. A spring 126 biases the spool and sleeve valve 120 to the position shown in FIG. 10 where the inlet 108 is open and inlet 106 is shut off. The solenoid housing 24 is also conventional in construction and conventionally controls the position of the spool and sleeve valve 120 and thus is not shown in detail. When the conventional solenoid assembly 26 is actuated, the piston is moved downwardly as shown in FIG. 10 such that inlet 106 becomes open and inlet 108 is shut off.

As clearly shown in FIG. 10, when the shuttle valve and spool valve are mounted on the front side 22 of the manifold via the fasteners 119, the slots 96 or front 22 of manifold 12 extend beyond the ends of the shuttle valve 18 and gasket 74 to remain exposed to ambient atmosphere. This allows the bleed ports 116 to prevent any pneumatic pressure build up in the end section 118 of bore 121 that might otherwise deter the axial movement of the spool and sleeve valve 120. Bleed ports 116 are in communication with bleed ports 102 through the shuttle valve and bleed apertures 94 through the gasket 74 which is in communication with the recessed slots 96 on the front side 22 of the manifold.

Pneumatic pressure is returned from the solenoid actuated valve 24 through either port 112 or 114 to inlet ports 130 or 132 in the shuttle valve 18. Each inlet port 130 and 132 lead to opposite sides of a ball shuttle 134 that opens either inlet 130 or 132 to outlet 136. Outlet 136 is aligned with triangular aperture 82 in the gasket and triangular exit passageway 80 in the manifold.

The shuttle ball 134 will not move to close off the other passageway 130 until any excess pneumatic pressure in the passageway 130 and downstream thereof in exit passageway 80 of the manifold is alleviated through the open communication of the outlet port 112 to exhaust port 110. Once the pressure in the downstream portion of passageway 130 is alleviated to the pressure provided by regulator 15, the ball shuttle moves to close off inlet 130. The fact that the exhaust port 110 is in communication through aperture 100 in the shuttle and to an exhaust port 88 and conduit 90 in manifold provides for a very quick decrease in downstream pressure down to the regulated level selected by the solenoid actuated valve.

As can be seen with the first module 11, the selection by the solenoid actuated valve 24 provides for quick change between two pressures that are set by regulators 14 and IS either from low to high pressure or from high to low due to the quick relief of pressure through the exhaust line 110, 100, 86, 88 and 90.

Figure 16:
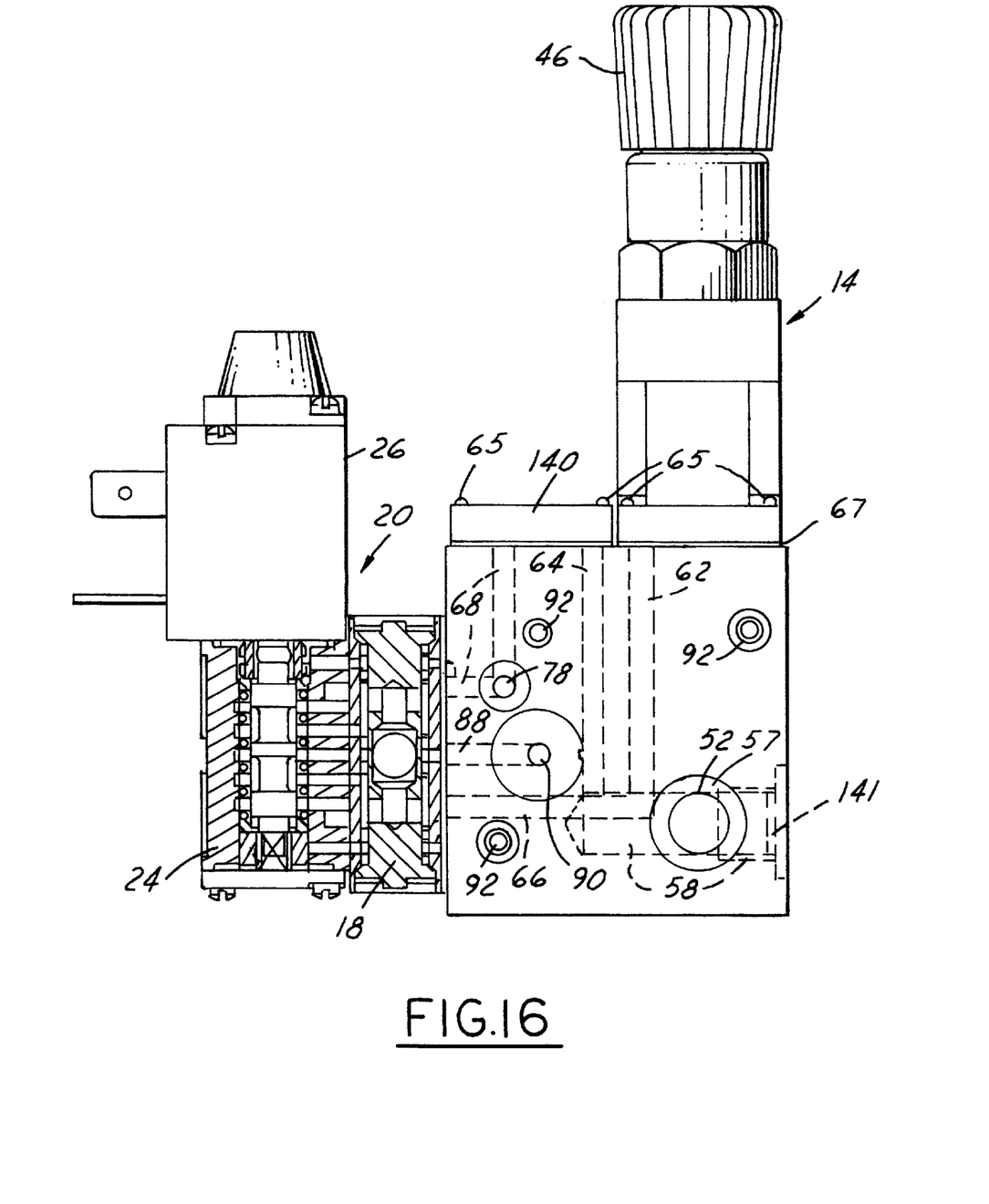
FIG. 16 is a side elevational and partially segmented view of a sequential module assembly.

The manifold assembly can also provide a selection of additional pressures in similar fashion by the addition of a second module 11b for a third pressure and a third module 11c for a fourth pressure and so forth. The second module 11b is shown in FIG. 16. The second module 11b has identical manifold 12, shuttle valve 18, and solenoid actuated valve 24, and regulator 14 as the first module 11a. One difference is that there is no regulator 15. Instead a plate 140 is mounted on the top side 16 to seal off passages 64 and 68 at the top side 16. Also, the intake side 54 of the manifold 12 is connected to the discharge side 56 of the manifold 12 in the first module such that supply ports 52 of both manifolds are aligned. Intake port 70 receives the pneumatic pressure from discharge port 84 in the first module 11a. There is no end plate 72 sealing off intake port 70 or supply port 52 on the intake side 54. The threaded supply tap 58 is plugged by a threaded fitting 141.

The function is therefore the same as the first module. One of the two pressures from the first module 11c is passed from the discharge port 84 in the first module 11a to the intake port 70 of the second module 11b such that the pressure passes through intermediate passage 68 and through passage 98 to inlet 108. Regulator 14 on the second module 11b is connected to the regulator supply passage 62 and is set to a third pneumatic pressure level which is passed onto inlet 106. The solenoid actuated valve 24 then is either actuated or deactuated to select the pneumatic pressure in inlet 106 or inlet 108 to be passed onto the discharge outlet 84 in the second manifold. With the appropriate actuation of the first and second solenoid actuated valves 24, one of three pressures can then be selected and changes to any of the three pressures can be rapidly made.

The third module 11c is identical to the second module. The appropriate actuation and deactuation of the solenoid actuated valves in the first, second, and third modules 11a, 11b, and 11c then can provide four pneumatic pressure levels in any desired rapid sequence.

Additional modules 11 can be sequentially added on to provide additional pneumatic pressure levels. If an operator wanted to add an additional pressure level, he merely needs to temporarily remove the last end plate 142 after the last module 11c, attach another module thereto and reattach the end plate 142 to the newly attached last module. The last end plate 142 has a discharge outlet 144 aligned with the discharge outlet 84 in the module 11c and allows a conduit be attacked thereto that leads to a selected tool (not shown). Exhaust port 150 also is aligned with exhaust conduit 90 in module 11c.

If the number of pressure levels is adequate but the operator desired to adjust one or more of the pressure levels, he merely needs to turn the adjustment knob 46 of one or more of the regulators 14 or 15.

If one of the outlet pressure levels is desired to be set at the primary pressure, the regulator 15 can be replaced by a bridge which allows the primary pressure to pass from passage 64 to intermediate passage 68.

In this fashion, an operator can customize what pressure levels and how many pressure levels he wants without the need to customize a manifold every time he desires a change in the number or level of pneumatic pressures. A mere assembly of identical module parts made from a manifold section and standard solenoid actuated valves, and regulators achieve what use to be difficult and expensive.

Variations and modifications are possible without departing from the scope and spirit of the present invention as defined by the appended claims.

I claim:

1. A control valve assembly for supplying a choice of preselected pressure levels from a pneumatic supply; said assembly characterized by:
   a manifold having a primary supply passage connectable to a supply of primary pressure;
   first and second regulators mounted onto said manifold each having an inlet for receiving pneumatic pressure from said primary supply passage and each having an outlet for providing respective different first and second lower secondary pressures from said primary supply passage;
   an electrically actuated selector valve mounted onto said manifold, said selector valve includes a housing with two inlet ports, two outlet ports and an exhaust port connected to a valve chamber and at least one valve element operably mounted in said chamber, said selector valve element being moveable to a selected one of two positions based on the actuation or de-actuation of the selector valve such that a respective inlet port is connected to its respective outlet port and the other inlet port is closed from its respective outlet port which in turn is in communication with said exhaust port;
   said inlet ports being in fluid connection with said respective outlet ports of said regulators for supplying said respective secondary pressures to said selector valve;
   the respective outlet port of the selector valve being connected to respective inlets of a shuttle valve, said shuttle valve having a single outlet selectively in communication with its inlet containing a higher pneumatic pressure therein;
   the exhaust port of the selector valve being in communication with an exhaust passage in the manifold; and
   the single outlet of the shuttle valve being in communication with an outlet passage in said manifold for receiving a selected one of the secondary pressures from the respective regulators via the selector valve.

2. A control valve assembly as defined in claim 1 further characterized by:
   said manifold having respective passageways for receiving the secondary pressure from said respective regulators and passing said secondary pressure onto said inlets of said selector valve.

3. A control valve assembly as defined in claim 2 further characterized by:
   said manifold having two opposite sides with an outlet side having a primary supply passage port, said exhaust passage and said outlet passage therethrough and having an inlet side with said primary supply passage port and secondary inlet port for receiving primary and secondary pressures.

4. A control valve assembly as defined in claim 3 further characterized by:
   said shuttle valve having a housing mounted in an interposed position between a respective selector valve and said respective manifold; and
   said shuttle valve-housing having an exhaust passage that connects the exhaust port of said selector valve to the exhaust passage in said manifold.

5. A control valve assembly as defined in claim 2 further characterized by:
   said shuttle valve having a housing mounted in an interposed position between said selector valve and said manifold; and
   said shuttle valve housing having an exhaust passage that connects the exhaust port of said selector valve to the exhaust passage in said manifold.

* * * * *

UNITED STATES PATENT AND TRADEMARK OFFICE
CERTIFICATE OF CORRECTION

PATENT NO.   : 6,257,277 B1
DATED        : July 10, 2001
INVENTOR(S)  : Donald E. McGeachy It is certified that error appears in the above-identified patent and that said Letters Patent is hereby corrected as shown below:

Column 4,
Line 58, change "passage" to -- passages --.

Column 5,
Line 26, change "discharge exit 80" to -- discharge exit passage 80 --.

Column 8,
Line 15, change "outlet port" to -- outlet ports --.

Signed and Sealed this

Twenty-sixth Day of February, 2002

Attest:

JAMES E. ROGAN
Attesting Officer           Director of the United States Patent and Trademark Office